United States Patent
Feigenblum et al.

(10) Patent No.: US 10,493,740 B2
(45) Date of Patent: Dec. 3, 2019

(54) DEVICE AND METHOD FOR COMPACTING AND CONSOLIDATION OF A PART IN COMPOSITE MATERIAL WITH A THERMOPLASTIC MATRIX REINFORCED BY CONTINUOUS FIBERS, PARTICULARLY FIBERS OF NATURAL ORIGIN

(75) Inventors: José Feigenblum, Saint-Paul (FR); Alexandre Guichard, La Chapelle du Mont du Chat (FR)

(73) Assignee: ROCTOOL, Le Bourgett du Lac (FR)

( * ) Notice: Subject to any disclaimer, the term of this patent is extended or adjusted under 35 U.S.C. 154(b) by 1221 days.

(21) Appl. No.: 14/008,577

(22) PCT Filed: Apr. 2, 2012

(86) PCT No.: PCT/EP2012/056006
§ 371 (c)(1),
(2), (4) Date: Oct. 8, 2013

(87) PCT Pub. No.: WO2012/131112
PCT Pub. Date: Oct. 4, 2012

(65) Prior Publication Data
US 2014/0023828 A1    Jan. 23, 2014

Related U.S. Application Data

(63) Continuation-in-part of application No. 13/275,928, filed on Oct. 18, 2011, which is a continuation-in-part
(Continued)

(30) Foreign Application Priority Data

Jun. 22, 2005  (FR) ........................ 05 51717
Apr. 1, 2011   (FR) ........................ 11 52814

(51) Int. Cl.
B32B 37/10    (2006.01)
B32B 3/06     (2006.01)
B32B 38/00    (2006.01)

(52) U.S. Cl.
CPC ............. *B32B 37/10* (2013.01); *B32B 3/06* (2013.01); *B32B 38/0004* (2013.01); *Y10T 156/1002* (2015.01); *Y10T 428/24488* (2015.01)

(58) Field of Classification Search
CPC ............ B29C 2035/0811; B29C 33/06; B29C 35/0805; B29C 70/465; B32B 37/10;
(Continued)

(56) References Cited

U.S. PATENT DOCUMENTS 3,842,234 A * 10/1974 Seyfried ............... H05B 6/102
                                                          219/639
5,040,962 A *  8/1991 Waszeciak ........... B29C 67/246
                                                          264/163
(Continued)

FOREIGN PATENT DOCUMENTS

DE    102007054723 A1   5/2009
FR         2882682 A1   9/2006
(Continued)

OTHER PUBLICATIONS

Fibershell: "Procede de fabrication—Fibershell," Youtube, Oct. 22, 2010, http://www.youtube.com/watch?v=hQoZsjYWSj0.

*Primary Examiner* — Tu B Hoang
*Assistant Examiner* — Diallo I Duniver
(74) *Attorney, Agent, or Firm* — Im IP Law; C. Andrew Im; Chai Im

(57) ABSTRACT

A device for compacting and consolidating a textile preform comprising continuous fibers impregnated with thermoplastic polymer, and a method for obtaining a part using such a
(Continued)

device. The device comprises a die, an induction heating device and a cooling device to cool the die. The die includes a form comprising a cavity that corresponds to the shape of the part, which form extends depth-wise between an entry plane and a bottom and is inserted into a frame. The induction heating device comprises two inductors extending in hollows of the form, each forming a winding in a plan, substantially parallel to the entry plane of the cavity, and located between the entry plane and the bottom of the form.

5 Claims, 3 Drawing Sheets

Related U.S. Application Data of application No. 11/993,159, filed as application No. PCT/FR2006/050338 on Apr. 11, 2006, now abandoned.

(58) Field of Classification Search
CPC ... B32B 38/0004; B32B 3/06; B29K 2101/12; H05B 6/105; Y10T 156/1002; Y10T 428/24488
USPC .................. 156/196, 500; 428/157; 219/617; 623/900, 901
See application file for complete search history.

(56) References Cited

U.S. PATENT DOCUMENTS

| | | | | |
|---|---|---|---|---|
| 5,057,175 | A * | 10/1991 | Ashton | B29C 43/228 156/202 |
| 5,483,043 | A * | 1/1996 | Sturman, Jr. | B29C 35/08 219/634 |
| 6,365,883 | B1 * | 4/2002 | Pohl | H05B 6/104 219/603 |
| 6,747,253 | B1 * | 6/2004 | Firth | H05B 6/105 219/634 |
| 2002/0185767 | A1 * | 12/2002 | Barker | B29C 35/0805 264/40.6 |
| 2003/0047199 | A1 * | 3/2003 | Worm | H01L 21/67051 134/33 |
| 2004/0058027 | A1 * | 3/2004 | Guichard | B29C 33/04 425/174.6 |
| 2004/0200550 | A1 * | 10/2004 | Pfaffnnann | B21D 26/033 148/526 |
| 2005/0000959 | A1 * | 1/2005 | Kagan | H05B 6/04 219/660 |
| 2009/0235715 | A1 * | 9/2009 | Werz | B21D 53/20 72/342.1 |
| 2010/0201040 | A1 | 8/2010 | Guichard et al. | |

FOREIGN PATENT DOCUMENTS

FR 2887739 A1 12/2006
FR 2922276 A1 4/2009

* cited by examiner

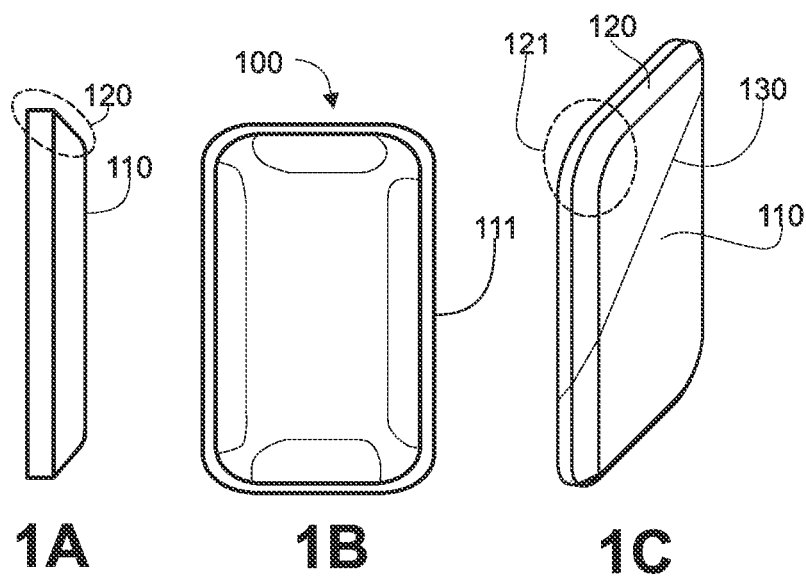
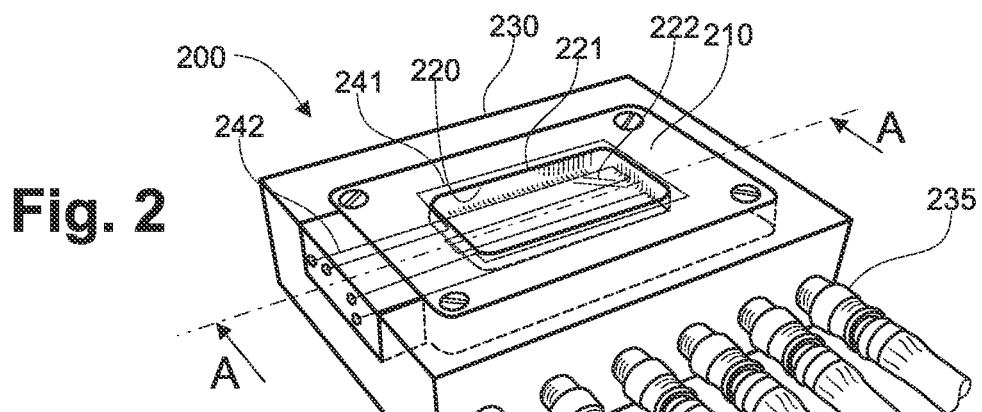
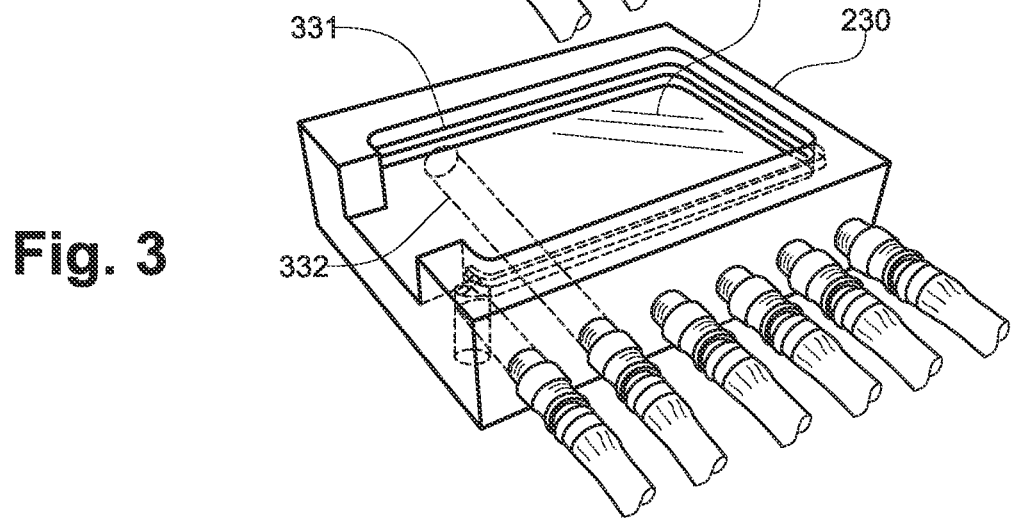
Fig. 1
Fig. 2
Fig. 3

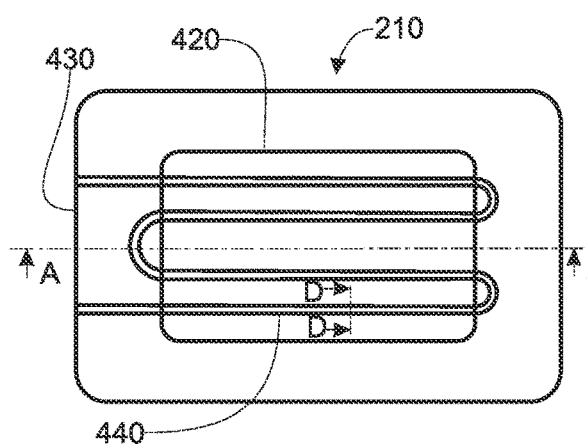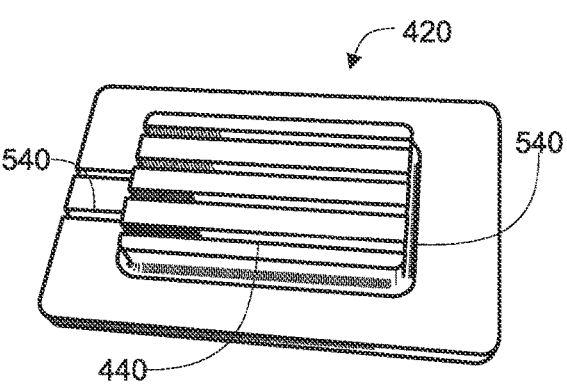
Fig. 4  Fig. 5
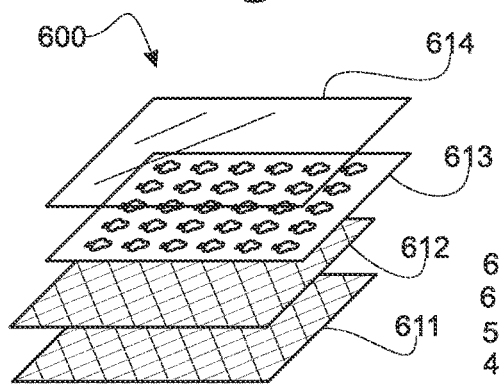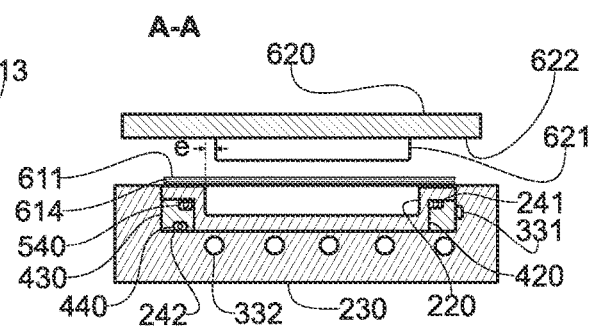
6A  6B
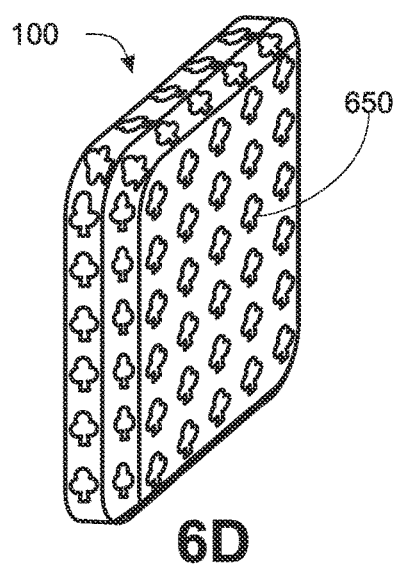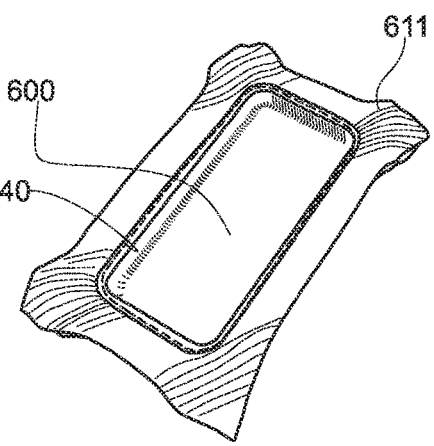
6D  6C
Fig. 6

DEVICE AND METHOD FOR COMPACTING AND CONSOLIDATION OF A PART IN COMPOSITE MATERIAL WITH A THERMOPLASTIC MATRIX REINFORCED BY CONTINUOUS FIBERS, PARTICULARLY FIBERS OF NATURAL ORIGIN

RELATED APPLICATIONS

This application is a § 371 application from PCT/EP2012/056006 filed Apr. 2, 2012, which claims priority from French Patent Application No. 11 52814 filed Apr. 1, 2001 and which is a continuation-in-part Application of U.S. application Ser. No. 13/275,928 filed Oct. 18, 2011, which is a continuation-in-part Application of U.S. application Ser. No. 11/993,159 filed Dec. 19, 2007 (now abandoned), which is a § 371 application from PCT/FR2006/050338 filed Apr. 11, 2006, which claims priority from French Patent Application No. 05 51717 filed Jun. 22, 2005, each of which is herein incorporated by reference in its entirety.

TECHNICAL FIELD OF THE INVENTION

The invention relates to a device and a method for compacting and consolidating a part in composite material with a thermoplastic matrix reinforced by continuous fibers, particularly fibers of natural origin. The invention is particularly suitable for the production in large runs of a part in composite material with a thermoplastic matrix, in the shape of a non-developable half shell comprising 4 flanged edges with a closed contour, connected by trihedral corner fitting connections. Such a part is particularly intended for use as a case or half shell for telecommunications terminals such as mobile telephones, personal digital assistants or tablet PCs. Said half shell may be used alternatively, but without limitation, as an enclosure for electronic components and as a screen support while assembling the object for which it is intended or may be used as a shell for additional protection adapted to accommodate the object in question.

BACKGROUND OF THE INVENTION

In these two cases of use, said shell must have structural qualities of rigidity and resistance to the impacts and indentations to which such equipment may be subjected, and also it must be made with precision so as to adapt perfectly to the dimensions of the object and/or components.

Other applications of the method according to the invention may be considered particularly in the making of a half shell designed for luggage items in order to make small cases, suitcases or protective cases.

In these applications as in the previous ones, the constraints relating to mechanical resistance and precision must be addressed, while keeping the objects lightweight.

These consumer goods are produced in very large runs and are subject to seasonality and decoration constraints to adapt them to the tastes of consumers or the distinctive colors and signs of their distributors. These products are intended for the general public and for equipment that is frequently renewed, and must allow advantageous recycling or, at least, have a low environmental impact.

To that end, it is advantageous to make such a part, particularly a half shell for a tablet PC, in stratified composite material comprising a thermoplastic matrix and a continuous fibrous reinforcement, wherein said fibrous reinforcement mostly comprises natural fibers of plant origin. The part is made up of a plastic matrix and continuous fibrous reinforcement, and is both lightweight and particularly strong. The thermoplastic nature of the matrix makes it easy to recycle, just as the nature of the reinforcing fibers limits its environmental impact in terms of the making of the raw material and its recycling or disposal as waste.

However, because the reinforcement is made up of continuous fibers, such a part cannot be made using the plastic injection methods that are generally considered for this type of mass manufacturing. Similarly, a method for stamping pre-consolidated thermoplastic blanks such as that described in document FR-A-2922276 is not applicable, because preheating the blank before stamping to a temperature that is sufficient to allow the relative sliding of the fibers in the non-developable areas, thanks to the fluidity of the resin, would lead to a risk of burning the fibers when the fibers are natural, particularly when they are of plant origin. The method described in document FR-A-2922276 is thus more particularly adapted to the manufacturing of a part where the fibrous reinforcement takes the form of carbon, glass or aramid fibers that are not liable to be affected by such burning phenomena at the melting temperature of the resin. Besides, the humidity content of natural fibers may be greater than 10%, which humidity is liable to be changed into water vapor during the hot stamping operation and could lead to quality defects.

The method described in document FR-B-2882682 solves the problem of the flammability of natural fibers by carrying out the forming process using a vacuum bag device. That method does not make it possible to obtain tight non-developable shapes such as corner fittings at the trihedral connections. That is because this method, which does not make it possible to put the textiles under tension, leads to the formation of creases and/or wrinkling in or near the non-developable areas. Besides, this method for forming and compacting using a membrane or bag does not allow high production rates that are suitable for the runs concerned by the intended applications. Thus, in the prior art, there is no method suitable for making such a part.

OBJECT AND SUMMARY OF THE INVENTION

In order to remedy the drawbacks of the prior art, the invention relates to a device for forming and consolidating a textile preform comprising continuous fibers impregnated with thermoplastic polymer, which device comprises:
   i. a die including a form comprising a cavity that corresponds to the shape of the part, which form extends depth-wise between an entry plane and a bottom and is inserted into a frame;
   ii. means for the induction heating of the form comprising two inductors, each forming at least one winding in planes at different heights, substantially parallel to the entry plane of the cavity and located between said entry plane and the bottom of the former;
   iii. means to cool the die;
   iv. a punch comprising a protruding part that corresponds to the shape of the part and distant from the cavity at a defined gap value, and a part adapted to act as a blank holder between said punch and the die.

Thus, the inductors surrounding the form make it possible to heat the form locally and rapidly to a temperature that is sufficient for melting the thermoplastic polymer impregnating the preform, by ensuring uniform temperature over the entire surface of the cavity, without heating the edges of the die or heating them only moderately, which edges cooperate with the edge of the punch to hold the edges of the preform and keep the fibers under tension during the forming process.

The invention also relates to a method for manufacturing a part with four flanged edges and a closed contour, made up of composite laminate material comprising a thermoplastic matrix and fibrous reinforcement with continuous fibers, particularly of plant origin, implemented using the device according to the invention, which method comprises the steps of:
 a. cutting an unconsolidated blank in a fabric impregnated with a thermoplastic polymer;
 b. placing said blank above the cavity of a device according to the invention;
 c. stamping said blank by moving the punch down into the cavity while holding the edges of the blank on the perimeter of the cavity and holding the blank pressed in the gap between the punch and the die;
 d. heating the part of the blank located in the cavity at a heating rate that is at least equal to $2° C. s^{-1}$ up to a temperature that is equal to or greater than the melting temperature of the thermoplastic polymer while maintaining the pressure in the gap without reaching the melting temperature of said polymer on the edges held on the perimeter of said cavity;
 e. cooling the cavity at a cooling rate greater than or equal to $2° C. s^{-1}$ to a temperature below the glass transition temperature of the polymer while maintaining the pressure in the gap;
 f. separating the punch from the cavity and stripping the part.

Thus, the method according to the invention makes it possible, by combining fast and localized heating and cooling in the part of the blank located in the cavity, to make the part in question without the risk of vaporizing the humidity contained in the natural fibers and by keeping the fabric under tension for making the trihedral connections and non-developable parts of the part.

The invention can be implemented in the advantageous embodiments described below, which may be considered individually or in any technically operative combination.

Advantageously, the induction heating means of the device according to the invention include an inductor forming at least one winding in a hollow extending between the bottom of the cavity and the bottom of the form. Thus, the inductors, placed under the bottom of the cavity, heat the surface of the cavity by thermal conduction between the part of the form, heated by induction by these inductors, and the bottom of the cavity. The distance between said inductors and the bottom of the cavity is determined so as to obtain uniform temperature over said bottom depending on the thermal conductivity of the material of which the form is made of.

Advantageously, the frame is made of non-magnetic material. Thus induction heating is concentrated in the form.

In a preferred embodiment, the form comprises a block in which the cavity is cut and a base holding said block. This embodiment makes it easier to make the form, particularly to make the hollows accommodating the inductors with tight connection radiuses, so that the inductors can be routed as close to the cavity as possible.

Advantageously, in that last embodiment, the base is made of a non-magnetic material. Thus, the induction heating is concentrated in the block comprising the cavity.

Advantageously, the inductors are made up of multiple-strand braided copper cables, wherein said strands are bare. Thus, said inductors are flexible and able to follow the contours of the cavity very closely. The absence of insulation covering each strand makes it possible to send high electrical intensities through said cables for rapid heating of the form, thus heating the inductors to high temperatures with no risk of damaging them.

In an advantageous embodiment, the form comprises two bores with secant center lines that form a hollow adapted to accommodate an inductor, wherein the continuity of the hollow between the two bores is provided by an added piece comprising a hollow with a connection radius adapted to the flexibility of the inductor. This embodiment of the form makes it possible to make hollows with tight local connection radiuses, so that said hollows follow the contour of the cavity very closely. Thus, the volume heated by induction is small, which makes it possible to reach high heating rates and localized heating of said form.

In a particularly advantageous embodiment of the device according to the invention, the form is made of a non-magnetic metallic material, and the hollows in which the inductors extend are coated with a coating layer of ferromagnetic material. This embodiment is conducive to evening the temperature in the cavity by thermal conduction in the material in which it is made.

In that last embodiment, the material in which the form is made of is selected from copper and its alloys or aluminum and its alloys. These materials are at the same time highly electrically and thermally conductive and also have high thermal effusivity. These properties make it possible to rapidly achieve uniform cavity temperature due to the high thermal conductivity of the material in which it is made, even when the inductors are placed near the perimeter of said cavity. The thermal effusivity of the material that makes up the form allows rapid transfer of temperature from the cavity to the textile preform.

The method and the device in the invention are particularly suited to the making of a part, particularly a half shell for tablet PCs or personal digital assistants, comprising four flanged edges with a closed contour, made in composite laminate material comprising a matrix made of a thermoplastic polymer and fibrous reinforcement plies comprising at least 30% continuous fibers made up mostly of natural fibers of plant origin, and including a decorative ply integrated into the lamination and made in a printed fabric, said decorative layer being fully covered by the polymer that makes up the matrix. Thus, the decoration is printed flat on the fabric making up the decorative ply and the decoration of the part is wear resistant.

In one embodiment of the part according to the invention, the thermoplastic matrix is made up of a first bio-sourced PET and the reinforcing fibers comprise fibers made of a second bio-sourced PET with a melting temperature that is higher than the melting temperature of the first PET. Thus, the PET fibers provide additional reinforcement and make it possible to increase the reinforcement content of the part without increasing the difficulties of forming the part.

BRIEF DESCRIPTION OF THE DRAWINGS

The invention is described below in its preferred embodiments, which are not limitative in any way, and by reference to FIGS. 1 to 10, wherein:

FIG. 1 represents a profile view (FIG. 1A), a front view (FIG. 1B) and a perspective profile view (FIG. 1C) of an exemplary embodiment of a part according to the invention;

FIG. 2 is an exemplary embodiment of the tooling die for implementing the method for manufacturing a part according to the invention;

FIG. 3, represents the same perspective view as FIG. 2 of a part of the die, wherein the form has been removed to make the frame visible;

FIG. 4 is a bottom view of the tooling form in FIG. 2, without the holding frame;

FIG. 5 is a bottom view of part of the form, in the case of the part comprising the cavity of the tooling shown in FIG. 2;

FIG. 6 is a diagrammatic view of an exemplary embodiment of the method according to the invention;

FIG. 9A is a sectional view along A-A as defined in FIG. 2, FIG. 9B is a sectional view along BB defining a plane parallel to the bottom of the cavity and FIG. 9C is a partial sectional view along a plane perpendicular to the plane of section B-B in a corner fitting connection area of the form.

DETAILED DESCRIPTION OF THE EMBODIMENTS

Figure 7:
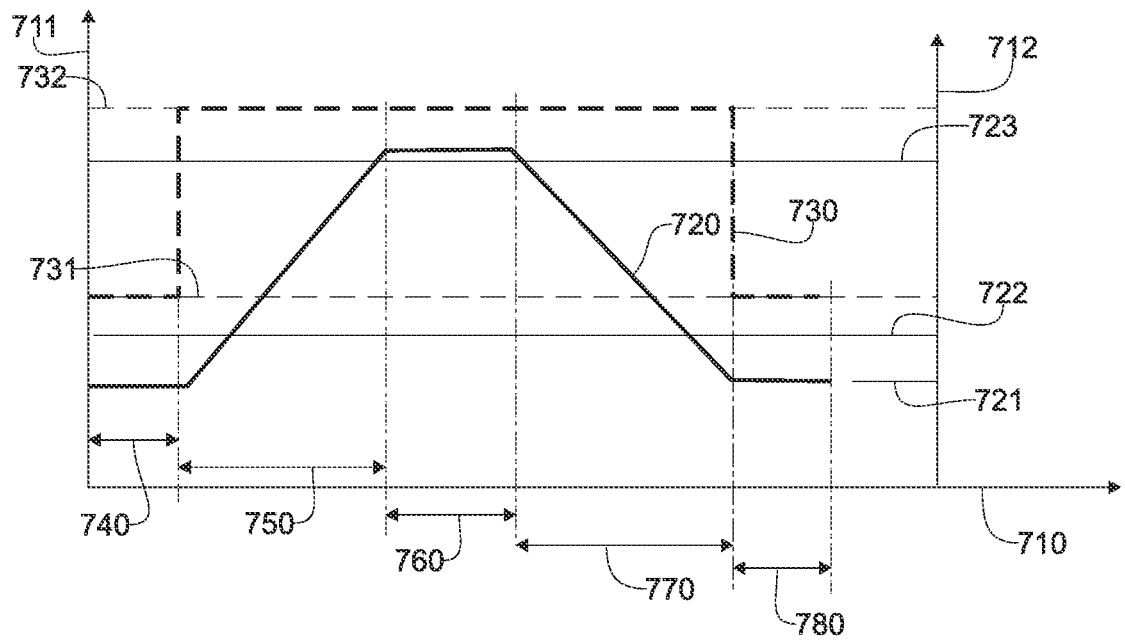
FIG. 7 shows an example of a pressure-temperature cycle used during the forming and consolidation of a part using the method according to the invention.

In FIG. 1 of one exemplary embodiment, the part (100) according to the invention takes the form of a half shell comprising a bottom (110) and flanged edges (120). The contour (111) of the part (100) is continuous so that the part comprises non-developable zones (121), called "corner fittings" at the trihedral connections between the turned-over edges (120) and the bottom (110). The bottom is represented flat here. In one advantageous embodiment (not represented), the bottom may follow a curved surface with a double curve. Said part (100) is made of composite laminate including several plies comprising so-called continuous fibers (130). The so-called continuous fibers extend uninterruptedly from one edge of the part (100) to the other. In an advantageous embodiment, said fibers are made up of continuous monolithic fibers or reconstructed continuous fibers, resulting from an arrangement of several filaments, for example in the form of spun cracked fibers.

In FIG. 2, an exemplary embodiment of the device according to the invention, adapted for manufacturing such a part, the device comprises a die (200), which is adapted to be fixed to the plate of a press (not represented). Said die (200) includes a first assembly called a "form" (210), which comprises the cavity (220), which reproduces, in recessed form, the outer surface of the part (100) to make. The form (210) is placed in a frame (230), which acts as the mechanical interface with the plate of the press and also supports several technical functions. Thus, the frame (230) is adapted to accommodate different forms (210) corresponding to different parts. The contour (221) of the intersection between the cavity (220) and the upper plane of the form (210) defines the plane of the entry of the cavity. The form (210) comprises an induction heating device. That device comprises a first inductor (241) made up of a circuit extending in a plane and forming a winding at a height close to the entry plane of the cavity (220). In this exemplary embodiment, a second inductor (242) is made up of a circuit extending in a plane and forming at least one winding at a height close to the bottom (222) of the cavity (220). The two circuits (241, 242) are connected in series to a generator.

In FIG. 3, the frame comprises a fluid circulation circuit around the form. That circuit is represented in part and schematically in FIG. 3. Said fluid circulation circuit comprises conduits (331) adapted to cool the edges of the form and the entry plane of the cavity, and conduits (332) adapted to cool the bottom (222) of the form. Said conduits (331, 332), which form a network, are supplied with fluid by supply means (235). The cooling fluid is mostly made up of water in order to allow effective cooling of the form (210). The fluid is made to circulate in that network under low pressure and in an open circuit, advantageously by inserting a buffer vessel in the circuit so that the fluid may possibly boil with no risk of explosion. According to a first exemplary implementation of that fluid network, the circulation of said fluid is maintained while the form is heated by induction, since that heating means provides enough energy to allow that operating mode. Alternatively and preferably, the circulation of fluid is interrupted and the circuit is drained before the form is heated, and said fluid circulation is only established during the cooling phases.

In FIG. 4, the form (210) is made up of two assembled parts:
a base (430)
and a block (420) comprising the cavity (220) that is housed in said base.

A groove (440) extends between the base (430) and the block (420), forming windings, and acts as the housing of an inductor (242) placed close to the bottom of the cavity. That groove (440) is closed by the bottom (340) of the frame (230) when the form (210) is mounted in said frame, thus forming a hollow in which the second inductor (242) extends. For the frame not to be heated by induction and in order to concentrate that heating in the form, said frame is made of a non-magnetic material.

In FIG. 5, the block (420) comprises a groove (540), which groove is closed by the base (430) when said block (420) is assembled in it, said groove forming a hollow close to the entry plane of the cavity, hollow in which the first inductor (241) extends.

Figure 8:
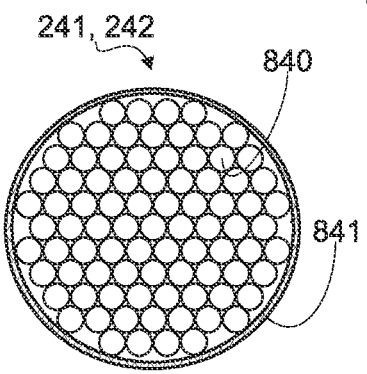
FIG. 8 is a sectional view of an inductor used for heating the tooling according to an exemplary embodiment of the invention.

In FIG. 8, in order to follow the hollows formed by the grooves of the form, the inductors (241, 242) are made of multiple braided strands (840), preferably made of copper (Cu). The multiple-strand configuration makes it possible, firstly, to reduce the section of inductors, including for working at a high frequency, by distributing the skin effects over all the strands, and secondly gives said inductors greater flexibility, allowing them to follow the contour of the cavity as closely as possible, particularly in areas with small curvature radiuses. Even though the use of multiple-strand cables for making inductors is known in the prior art, in the form of so-called Litz wires, the cables of the prior art use strands that are individually insulated, in order to contain the skin effects in each strand and make the most of the entire section of the inductor for passing the current. The skin effect corresponds to the concentration of the electric current flowing through a conductor on the periphery of its section, so that the effective conduction section of the electric current is far smaller than the section of the conductor, which is thus liable to be significantly heated due to the Joule effect because of the density of the current conducted by that effective section. The higher the frequency of the current, the more marked the effect. It is thus particularly noticeable in conductors that use high frequencies. In order to remedy that effect, so-called Litz wires like those described above are used. However, such cables impose an operating temperature of the inductor that is limited by the temperature that can be withstood by each individual insulator of each strand, or a maximum temperature of about 180° C. for the insulators in epoxy resin that are generally used for that purpose. In a surprising effect, the use of so-called bare strands, which are not individually coated with an insulating sheath, makes it possible to pass current densities that are just as large, but with no practical limitation on the temperature of the inductor, while reducing the diameter of the inductor, because of the absence of an insulating coating on each strand, and further improving the flexibility of the inductor. An insulating sheath (841) that is heat resistant, for example in the form of a sheath braided from silica fibers, is advantageously used to electrically insulate the outside of the multiple-strand cable.

Figure 9:
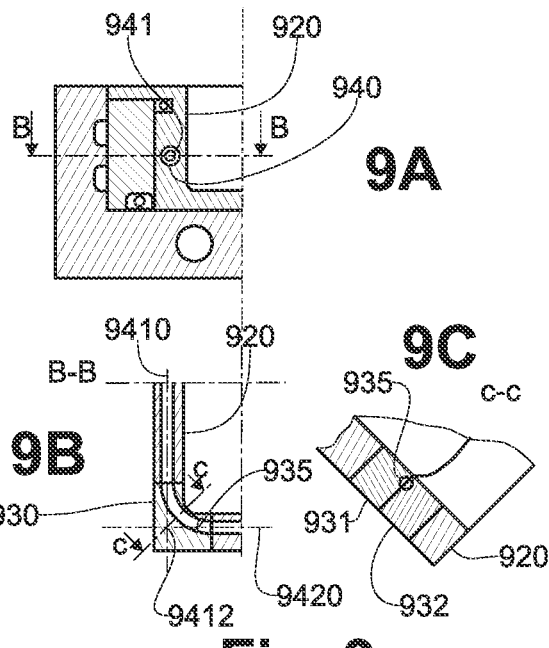
FIG. 9 is a partial sectional view of an exemplary embodiment of the tooling according to the invention in a case where the form is deep drawn.

In FIG. 9A, in one exemplary embodiment of the device according to the invention, the form is deep drawn, and an inductor is placed in an intermediate plane between the bottom of the cavity and the entry plane, to heat the cavity (920). To that end, an additional inductor (941) is placed in an intermediate plane, for example at mid height of the cavity. The hollow (940) adapted to accommodate such an inductor (941) is then difficult to make by grooving, particularly if the inductor must be placed close to the surface of the cavity (920). In those conditions, the hollow (940) is advantageously made by drilling, particularly by means of deep drilling techniques using so-called ¾ bits or gun drill bits. In FIG. 9B, the difficulty of that technique lies in making said hollow (940) follow the contour of the cavity (920), making it necessary to drill holes with secant center lines (9410, 9420), where at least one end must then be closed. The intersection point (9412) of the drilled holes is then far away from the edges of the cavity (920) in that area, where heating efficiency is primordial and that intersection also constitutes an angular point that requires the inductor to be bent with a small curvature radius. To remedy that drawback, an insert (930) is placed in a housing made in the block (920) including the cavity, which insert (930) includes a hollow (935) extending along a circular center line that follows the minimum curvature radius permissible for the cable that makes up the inductor. In FIG. 9C, the insert (930) is advantageously made up of two assembled parts (931, 932), each comprising half a groove (935), made by milling. Thus, the spatial distribution of the sources of heating energy and the fluid circulation around the form make it possible to carry out very rapid cavity heating and cooling cycles by simultaneously allowing the even distribution of temperature over the entire surface of the cavity (220) and steep temperature gradients on the edges (221) of the cavity. Thus, the melting temperature of the resin is reached uniformly in the cavity, thereby allowing the even distribution of the thermoplastic polymer that makes up the matrix throughout the volume of the part. However, that melting temperature is not reached beyond the edges (221) of said cavity, thus allowing the control of the tensioning and slipping of the fabric on the edges in order to avoid the formation of folds in the non-developable areas (121) of the part.

In FIG. 6, the advantageous characteristics of the device according to the invention are put to good use to make the part with the help of a method that is also according to the invention. In one exemplary embodiment of that method, shown in FIG. 6A, several layers making up the plies of the final composite are stacked in order to constitute a textile preform (600). The first two layers (611, 612) are, for example, made of a fabric of natural plant fibers, such as flax, cotton or hemp fibers, powdered with thermoplastic polymer, fabric in such fibers wrapped with such a polymer or fabric comprising commingled thermoplastic and plant fibers. As a non-limitative example, the thermoplastic polymer is selected from a group comprising:

acrylonitrile butadiene styrene or ABS;
polyolefins;
polybutylene terephthalate or PBT;
polyethylenimine or PEI;
polyetherketone or PEK;
polyetheretherketone or PEEK;
polyphenylene sulphide or PPS;
polyamides such as polycaprolactam (PA6) or polyhexamethylene adipamide (PA6-6);
depending on the properties required for the part.

In another non-limitative exemplary embodiment, a bio-sourced thermoplastic polymer is used, advantageously chosen from a group including:

polyamides (PA), particularly PA11
bio-sourced polyethylene (PET);
polylactic acid (PLA);
or bio-sourced polyesters.

In these different exemplary embodiments, the melting temperatures of the thermoplastic polymers are greater than 100° C., even 200° C. or 300° C. in some of them. But natural fibers like linen fibers are liable to be burnt and damaged above 120° C. and the humidity contained in them is liable to be vaporized above 100° C. These implementation difficulties are solved by the dynamics of the method, which dynamics are made possible by the device according to the invention, particularly for the heating and cooling of the assembly making up the matrix.

To go back to FIG. 6A, a third layer (613) is made up of printed fabric, which only has a decorative role. For example, it may be a printed cotton fabric. The fourth layer (614) is a thermoplastic film selected advantageously from the polymers listed above.

In another exemplary embodiment, the method according to the invention is used to make parts from blanks in the form of fabric comprising fibers blended with polyethylene (PET) of different constitutions. The differences in the composition of said fibers give them different melting temperatures. All or part of these fibers may be derived from bio-sourced polyethylene. Thus, the accurate control of the temperature in the cavity (220) makes it possible to melt only part of the fibers, those that will make up the matrix of the final part, while the other fibers retain their integrity and their task of reinforcing the part. That implementation is compatible with the insertion of decorative fabric in the stack. This version of implementation of the method is particularly adapted for making parts intended for luggage products.

Even if they are not taken to their melting temperature during forming, the PET reinforcing fibers can be deformed at the melting temperature of the polymer that makes up the matrix of the composite. Thus, the reinforcement content can be increased by the presence of these PET fibers without increasing the difficulties for forming the part.

In FIG. 6B, the stack (611, 612, 613, 614) is placed on the die (200) of the device according to the invention, with no special preparation for small parts such as protective shells for mobile telephones. If a larger shell is made, for example for making a lid or a bottom of a suitcase or trunk, the fabric stack may be stabilized by assembling the layers to each other by weld tacks or seams, particularly to achieve the direction of the pattern of the printed fabric in relation to the final part. The die (200) is placed on one of the press plates (not represented). The printed fabric (613) is, in this exemplary embodiment, placed with the printed side turned to the bottom of the cavity (220) and towards the outside of the stack, so that the printed side is visible on the convex side of the part. With the stack of fabric placed on the die (200), the forming and consolidation cycle is started.

FIG. 7 is a diagram of the time (710), temperature (712) and force (711), the change in temperature (720) in the cavity and the closing force (730) of the device according to the invention during such a cycle of forming and consolidation. The first step (740) is that of placing the fabric on the die (200) of the device according to the invention, when it is at the ambient temperature (721), when the closing force of said device is zero (731).

During the second step (750), the stack of fabric is stamped between a punch (620) and the die (200) by closing the device according to the invention at the press closing force (732).

In FIG. 6B, the punch (620) is fixed to the plate of a press (not shown), opposite the plate on which the die (200) is fixed. The punch (620) comprises two parts. A first part (621) has a shape complementary to that of the cavity (220), distant from it by a gap (e) when the punch (620) is down and in contact with the die. A second part (622), extends in a plane above the first part (621) and constitutes a blank holder adapted to clamp the edges of the stack of fabric (611, 612, 613, 614) between said blank holder and the upper part of the matrix corresponding to the cavity entry plane (220). Advantageously, the first part (621) of the punch (620) protruding from the blank holder (622) is made of silicone. When the punch (620) is brought closer to the die (200) by the closing of the press, the central part of the stack of fabric is pushed in the cavity (220) and the edges of the stack of fabric are clamped between the edges of the cavity and the blank holder. Thus, the fabric is stretched, particularly in non-developable areas, thereby avoiding the formation of creases in those areas.

To go back to FIG. 7, during the stamping step (750), after the closing of the press, the temperature of the cavity is increased very fast at a heating rate at least equal to 2° C. s$^{-1}$ by implementing induction heating, up to a temperature that is equal to or greater than the melting temperature (723) of the thermoplastic material making up the matrix of the part, with the closing pressure of the tooling held constant. For example, in the case of the use of a thermoplastic matrix of the PA11 type, where the melting temperature is 185° C., the temperature may be reached in 60 seconds.

The stamping phase (750) is followed by a hold phase (760) when the cavity is maintained at the melting temperature (723) of the resin and the mould closing force is also held at its maximum value (732). Preferably, that hold phase (760) lasts about 30 seconds.

At the end of the hold phase (760), induction heating is interrupted and the circulation of fluid in the conduits (331, 332) of the frame (230) is restored so as to rapidly cool the form (210). The closing force of the mould is held during that cooling phase (770), making it possible to consolidate the part. Such consolidation is reached when the temperature of the cavity is lower than the glass transition temperature (722) of the thermoplastic resin. Cooling is continued up to ambient temperature (721) before the tooling is opened and the part is stripped off (780). To that end, for large manufacturing runs, the tooling die (200) has means (not shown) to automate stripping.

The part is then transferred to a trimming station. As seen in FIG. 6C, at the end of the forming and consolidation operation, the stripped blank shows a consolidated part (600) and at the edges, parts of unconsolidated fabric. Trimming is aimed at removing these unconsolidated edges.

Said trimming can be carried out by a cutting tool mounted on a press adjacent to the press used for forming and consolidation, or by machining, e.g. milling on a numerically controlled machine. In these examples, the blank is trimmed along a contour (640) located in its consolidated part (600). The turned-over edges of the consolidated part (600) of the blank are thus wider than those of the final part in order to trim them in a consolidated part.

In FIG. 6D, the part (100) is finished at the end of trimming. In this exemplary embodiment, the decorated side (650) is located on the outside of the part, on its convex side. Decoration is integrated in the thickness of the part under a layer of resin. It is thus much stronger than decoration by printing on the surface of the finished part To go back to FIG. 6B, the inductors (241, 242) are placed very close to the cavity, and the combination of these characteristics with the high dynamics of heating and cooling makes it possible to only set off the melting of the thermoplastic matrix in the part of the stack of fabric that is located in the cavity, and the edges of the stack remain below the melting temperature of the matrix.

In all, the whole fabric located in the cavity (220) remains at a temperature above 100° C. for less than 2 minutes. That short stay at a high temperature, combined with the uniform temperature over the entire surface of the cavity makes it possible to make sure that there are no burns or discoloring of the fibers of the reinforcing fabric (611, 612) and the decorative fabric (613), that there are no defects relating to the vaporizing of the humidity contained in the fibers of both the reinforcing fabric (611, 612) and the printed fabric (613) and that the resin is evenly distributed throughout the volume of the part. The uniformity of the temperature over the surface of the cavity during the entire cycle also makes it possible to achieve a uniform appearance of the surface of the part, particularly in terms of the surface condition. The embodiment represented in FIG. 9 facilitates the making of such coated hollows in areas with a small connection radius.

Figure 10:
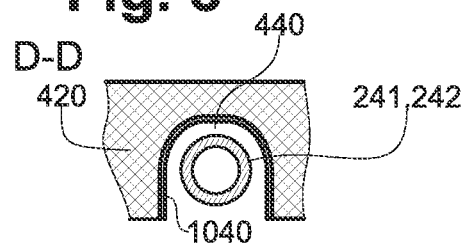
FIG. 10 represents a partial sectional view along D-D defined in FIG. 4 of a detail of embodiment of the hollows accommodating the inductors in the block of the form, according to an exemplary embodiment of the device according to the invention.

In FIG. 10 of one exemplary embodiment of the device according to the invention, the block (420) making up the form is made of an electrically conductive non-magnetic material. As a non-limitative example, said block (420) is made of copper (Cu) or a copper and beryllium (Be) alloy. In another exemplary embodiment, said block is made of an aluminum alloy. These materials have high thermal and magnetic conductivity. In this embodiment, the surfaces of the grooves (440) that make up the hollows accommodating the inductors (241, 242) are covered by coating (1040) made in a ferromagnetic material, for example nickel or a ferrous alloy. Thus, when an alternating electric current at a high frequency flows in said inductors (241, 242), said coating (1040) is heated by induction and transmits its heat to the block (420), which transmits it by conduction to the part placed in the cavity. The high thermal conductivity of the material of the block (420) in this embodiment allows the rapid evening out of the temperature over the entire surface of the cavity.

The description above and the exemplary embodiments show that the invention achieves the desired objectives; in particular, the device according to the invention allows the rapid and uniform heating of the cavity and thereby the making of composite parts comprising fibers of plant origin in a thermoplastic matrix.

The invention claimed is:

1. A forming and consolidating device to form a part by stamping between a punch and a die, a non-consolidated textile preform comprising a stack of plies comprising a thermoplastic matrix reinforced by continuous fibers extending uninterruptedly for one edge of the plies to the other, the device comprising:
   a die including a form comprising a cavity that corresponds to a shape of the part, the form extends depthwise between an entry plane of the cavity and a bottom of the cavity and the form is inserted into a frame, the frame being made of a non-magnetic material, the form comprising a block in which the cavity is cut, the block being made of a copper or an aluminum alloy, and a base holding the block, the base being made of a non-magnetic material;
   an induction heating device comprising two inductors extending in holes or grooves in the base and the block to form two continuous hollows, surfaces of the holes or grooves in which the two inductors extend are coated with a layer of a ferromagnetic material, each inductor forming a winding in a different continuous hollow inside the form in planes at different heights, substantially parallel to the entry plane of the cavity and located between said entry plane and the bottom of the cavity, wherein a first winding is closer to the entry plane and a second winding is closer to the bottom of the cavity;
   a cooling device to cool the die by circulating a fluid in a circuit around the form comprising conduits in the frame, wherein the cooling device comprises a buffer vessel in the circuit so that the fluid can boil, so that edges and entry plane of the cavity are cooled when the induction heating device is energized to heat the cavity such that the melting temperature of a thermoplastic polymer is reached uniformly in the cavity but the melting temperature is not reached beyond the edges of the cavity; and
   a punch comprising a protruding portion that corresponds to the shape of the part and distant from the cavity at a defined gap value when the punch is in the die, and a second portion extending above the protruding portion and configured as a blank holder to clamp edges of the non-consolidated textile preform between the die and the blank holder on the entry plane of the form in response to a movement of the punch towards the die during shaping of the non-consolidated textile preform into the shape of the part by stamping such that the forming and consolidating device forms and consolidates the non-consolidated textile preform comprising the stack of fabric plies with the continuous fibers impregnated with the thermoplastic polymer into the part of the shape of a non-developable half shell comprising four flanged edges with a closed contour, connected by trihedral corner fitting connections, while the part of the textile preform clamped by the blank holder remains unconsolidated.

2. The device according to claim 1, wherein the second winding extends between the bottom of the cavity and the bottom of the form.

3. The device according to claim 1, wherein the inductors are made up of multiple-strand braided copper cables wherein said strands are bare.

4. The device according to claim 1, wherein each continuous hollow comprises two bores with secant center lines and a continuity of said each hollow between the two bores is provided by an added piece with a connection radius adapted to the flexibility of the inductor.

5. A method for manufacturing a part with four flanged edges and a closed contour, made up of a laminated composite material comprising a thermoplastic matrix and fibrous reinforcement with continuous fibers of plant origin, implemented using a device according to claim 1 and comprising the steps of:
   a. cutting an unconsolidated blank in a fabric impregnated with a thermoplastic polymer;
   b. placing said blank above the cavity of the device according to claim 1;
   c. stamping said blank by moving a punch according to claim 1 down into the cavity while holding the edges of the blank on the perimeter of the cavity and holding the blank pressed in the gap (e) between the punch and a die according to claim 1;
   d. heating the part of the blank located in the cavity at a heating rate that is at least equal to 2° C./s up to a temperature that is equal to or greater than the melting temperature of the thermoplastic polymer while maintaining the pressure in the gap without reaching the melting temperature of said polymer on the edges held on the perimeter of said cavity;
   e. cooling the cavity at a cooling rate greater than or equal to 2° C./s to a temperature below the glass transition temperature of the polymer while maintaining the pressure in the gap; and
   f. separating the punch from the cavity and stripping the part.

* * * * *